(12) United States Patent
Kang et al.

(10) Patent No.: US 7,941,643 B2
(45) Date of Patent: May 10, 2011

(54) MULTI-THREAD PROCESSOR WITH MULTIPLE PROGRAM COUNTERS

(75) Inventors: Jack Kang, Sunnyvale, CA (US); Yu-Chi Chuang, Jhubei (TW)

(73) Assignee: Marvell World Trade Ltd., St. Michael (BB)

( * ) Notice: Subject to any disclaimer, the term of this patent is extended or adjusted under 35 U.S.C. 154(b) by 328 days.

(21) Appl. No.: 11/775,152

(22) Filed: Jul. 9, 2007

(65) Prior Publication Data

US 2008/0040578 A1   Feb. 14, 2008

Related U.S. Application Data

(60) Provisional application No. 60/822,322, filed on Aug. 14, 2006.

(51) Int. Cl.
*G06F 9/32* (2006.01)
(52) U.S. Cl. ...................................................... 712/214
(58) Field of Classification Search ........................ None
See application file for complete search history.

(56) References Cited

U.S. PATENT DOCUMENTS

| | | | |
|---|---|---|---|
| 6,295,600 B1 * | 9/2001 | Parady | 712/228 |
| 7,360,064 B1 * | 4/2008 | Steiss et al. | 712/219 |
| 2003/0023835 A1 * | 1/2003 | Kalafatis et al. | 712/214 |
| 2004/0148606 A1 | 7/2004 | Hosoe | |
| 2007/0174372 A1 * | 7/2007 | Feghali et al. | 708/200 |
| 2007/0204137 A1 * | 8/2007 | Tran | 712/214 |

OTHER PUBLICATIONS

Matz, Kevin. "Calling Interrupts". 1997, pp. 1-7.*

* cited by examiner

*Primary Examiner* — Robert Fennema (57) ABSTRACT

A system, apparatus and method for an interleaving multi-thread processing device are described herein. The multi-thread processing device includes an execution block to execute instructions and a fetch block to fetch and issue instructions, interleavingly, of a first instruction execution thread and at least one other instruction execution thread. The fetch block includes at least one program counter, which is allocable and/or corresponds to each instruction execution thread.

27 Claims, 9 Drawing Sheets

| | ST₁ | ST₂ | ST₃ | ST₄ | ST₅ | ST₆ |
|---|---|---|---|---|---|---|
| Cycle 1 | T0 | T0 | T0 | T0 | T0 | T0 |
| Cycle 2 | T1 | T0 | T0 | T0 | T0 | T0 |
| Cycle 3 | T1 | T1 | T0 | T0 | T0 | T0 |
| Cycle 4 | T1 | T1 | T1 | T0 | T0 | T0 |
| Cycle 5 | T1 | T1 | T1 | T1 | T0 | T0 |
| Cycle 6 | T1 | T1 | T1 | T1 | T1 | T0 |
| Cycle 7 | T1 | T1 | T1 | T1 | T1 | T1 |
| | 310 | 320 | 330 | 340 | 350 | 360 |

| | Cycle 1 | Cycle 2 | Cycle 3 | Cycle 4 | Cycle 5 | Cycle 6 | Cycle 7 | |
|---|---|---|---|---|---|---|---|---|
| $ST_1$ | T0 | T1 | T2 | T0 | T1 | T2 | T0 | 410 |
| $ST_2$ | T0 | T0 | T1 | T2 | T0 | T1 | T2 | 420 |
| $ST_3$ | T0 | T0 | T0 | T1 | T2 | T0 | T1 | 430 |
| $ST_4$ | T0 | T0 | T0 | T0 | T1 | T2 | T0 | 440 |
| $ST_5$ | T0 | T0 | T0 | T0 | T0 | T1 | T2 | 450 |
| $ST_6$ | T0 | T0 | T0 | T0 | T0 | T0 | T1 | 460 |

MULTI-THREAD PROCESSOR WITH MULTIPLE PROGRAM COUNTERS

CROSS-REFERENCES TO RELATED APPLICATIONS

The present application claims the benefit under 35 U.S.C. §119(e) of provisional application Ser. No. 60/822,322, filed on Aug. 14, 2006, incorporated herein by reference in its entirety for all purposes.

TECHNICAL FIELD

Embodiments of the present invention relate to the fields of data processing, storage, and communication. More particularly, various embodiments relate to techniques for interleaving execution of multiple instruction execution threads on a processor, including the use of multiple program counters correspondingly associated with the instruction execution threads.

BACKGROUND

Modern multi-core processors have multiple pipelines to run multiple applications and as a result often improve performance for a system simultaneously running multiple tasks. Unfortunately, these multi-core processors also require substantially more power and use more area than a comparable single pipeline processor.

Prior art single pipeline processor may allow multi-thread processing by employing an operating system to manage hardware resource usage and thread switching. However, a significant performance penalty is incurred each time the processor changes threads.

SUMMARY OF INVENTION

In view of the problems in the state of the art, embodiments of the invention are based on the technical problem of optimizing interleaving of multiple instruction threads on a processor, and methods for such instruction thread interleaving. A processing system, suitable to solve the problems upon which at least one embodiment of the invention is based, includes an execution block to execute instructions, a fetch block to interleavingly fetch and issue instructions of the various instruction execution threads, and a different program counter associated with each instruction execution thread.

More specifically, with the foregoing and other items in view, there is provided, in accordance with various embodiments of the invention, a processing device including an execution block to execute instructions and a fetch block, coupled to the execution block, to interleavingly fetch and issue instructions of a first instruction execution thread and a second instruction execution thread for execution by the execution block. The fetch block includes a program counter allocable and/or corresponding to each instruction execution thread. In one embodiment, the execution block includes at least one execution means, such as a processing core co-disposed in an integrated circuit package with the fetch block. In another embodiment, the fetch block may include at least one instruction dispatch means, such as an instruction unit responsible for ensuring that instructions are properly decoded, fetched, queued, and dispatched for execution. Besides containing control circuitry for performing these functions, the instruction dispatch means may also include an instruction cache, such as a multi-level cache, to allow instructions of each thread to be fetched as a batch and executed sequentially, thereby avoiding latencies that would traditionally be encountered were each instruction to be retrieved from memory individually.

In accordance with another feature of at least one embodiment of the invention, there is provided a scheduler, coupled to the fetch block, to control interleavingly fetching and issuing of instructions by the fetch block. In accordance with a further feature of at least one embodiment of the invention, the scheduler outputs an execution thread selection signal to the fetch block to control the fetch block's interleavingly fetching and issuing of instructions. In accordance with an added feature of at least one embodiment of the invention, the scheduler controls the fetch block's interleavingly fetching and issuing of instructions based at least in part on corresponding contiguous execution clock cycle allocations of the instruction execution threads. In accordance with yet a further feature of at least one embodiment of the invention, the fetch block is adapted to fetch and issue at least one instruction for a selected one of the first and second instruction execution threads each time the fetch block is signaled by the scheduler to fetch instructions for the selected one of the first and second instruction execution threads.

In accordance with an additional feature of at least one embodiment of the invention, interrupt circuitry, coupled to the fetch block is provided to interrupt the fetch block on behalf on the instruction execution threads. In accordance with yet an additional feature of at least one embodiment of the invention, the interrupt circuitry includes a first and a second interrupt circuitry block to correspondingly interrupt the fetch block for the first and second instruction execution threads respectively. In accordance with still yet an additional feature of at least one embodiment of the invention, the fetch block is adapted to immediately switch to fetch and to issue instructions for the first instruction execution thread on receipt of an interrupt for the first instruction execution thread while fetching and issuing instructions for an instruction execution thread other than the first instruction execution thread. In accordance with again another feature of at least one embodiment of the invention, the fetch block is adapted to fetch and issue at least one instruction for the first instruction execution thread before processing the received interrupt for the first instruction execution thread. In accordance with again a further feature of at least one embodiment of the invention, the fetch block is adapted to process an interrupt for a selected one of the first and second instruction execution threads only while fetching and issuing instructions for the selected one of the first and second instruction execution threads.

In accordance with yet another feature of at least one embodiment of the invention, there is provided memory to store at least a first and a second corresponding subset of instructions of the first and second instruction threads. The memory may be tightly coupled and/or cache or any other suitable type of memory, memory arrangement or memory subsystem.

In accordance with yet an added feature of at least one embodiment of the invention, there is provided an instruction cache to store at least a first and a second corresponding subset of instructions of the first and second instruction threads.

In accordance with again an additional feature of at least one embodiment of the invention, the processing device is a processor such as, for example, a central processing unit (CPU). In accordance with still a further feature of at least one embodiment of the invention, the processing device is an embedded processor such as, for example, a microprocessor or a microcontroller. In accordance with a concomitant feature of the invention, the processing device is an integrated circuit.

With the various embodiments of the invention in view, there is also provided a method including interleavingly fetching, issuing, and executing instructions of different instruction execution threads.

In accordance with a further mode of at least one embodiment of the invention, the method also includes scheduling the fetching and the issuing of instructions of the first and second instruction execution threads using an execution thread selection signal. In accordance with an added mode of at least one embodiment of the invention, the scheduling is based at least in part on corresponding contiguous execution clock cycle allocations of the instruction execution threads.

Other features that are considered as characteristic for embodiments of the invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

"Circuitry," as used in any embodiment herein, may comprise, for example, singly or in any combination, hardwired circuitry, programmable circuitry, state machine circuitry, and/or firmware that stores instructions executed by programmable circuitry.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but it may. For the purposes of the instant description, the phrase "A and/or B" means "(A), (B), or (A and B)." For the purposes of the instant description, the phrase "at least one of A, B and C" means "(A), (B), (C), (A and B), (A and C), (B and C) or (A, B and C)." For the purposes of the instant description, the phrase "(A)B" means "(B) or (AB)," that is, A is an optional element.

Figure 1:
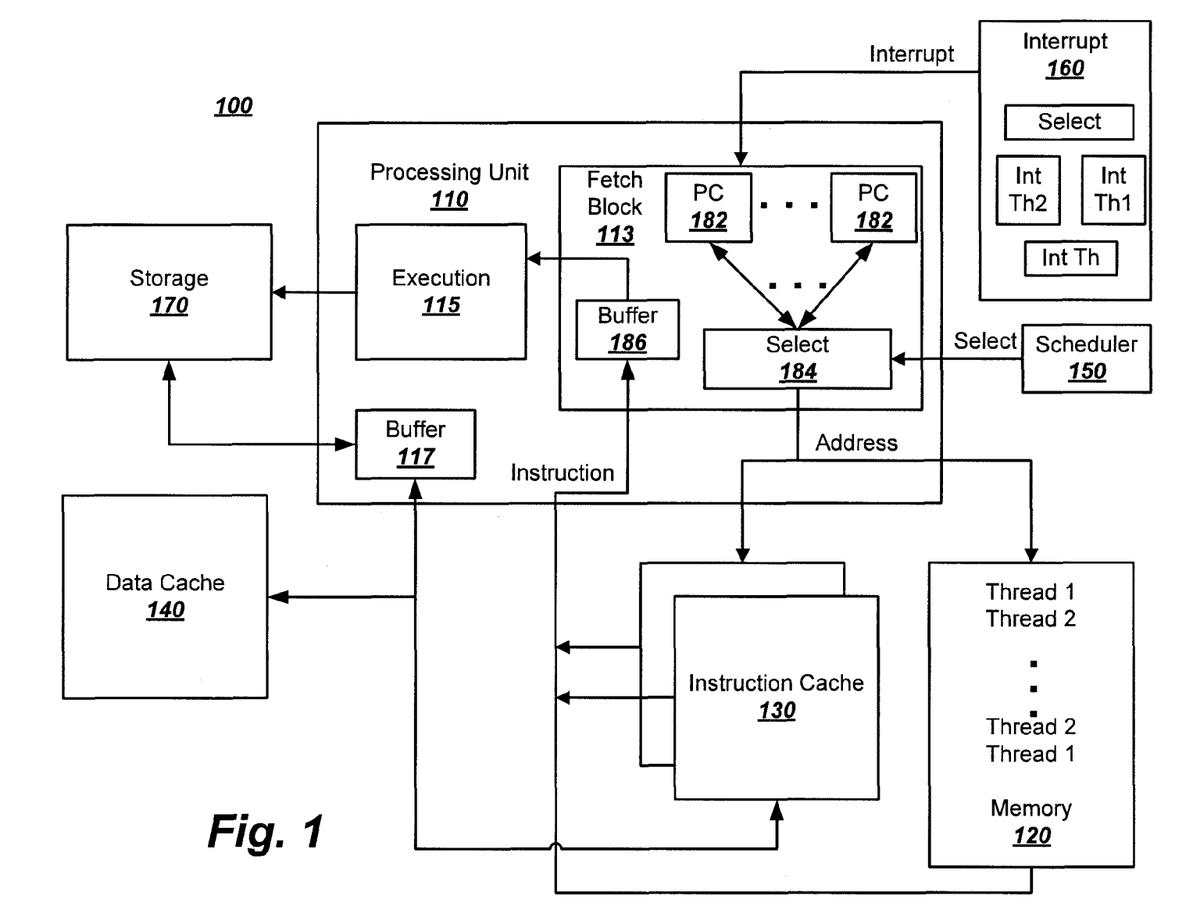
FIG. 1 illustrates a block diagram of an exemplary interleaving multi-thread processing environment in accordance with at least one embodiment.

Referring to FIG. 1, an exemplary interleaving multi-thread processing environment 100 having a multi-thread processing unit 110 with a fetch block 113, an execution block 115, and a buffer 117 is shown. The multi-thread processing environment 100 also illustrates various closely associated system devices, which are coupled to the processing unit 110 including memory 120, an instruction cache 130, a data cache 140, a scheduler 150, an interrupt handler 160, and storage 170. In accordance with various embodiments, memory 120 may be tightly controlled memory and/or cache, or any other suitable type of memory, memory arrangement, or memory subsystem.

In one embodiment, a processing unit 110 includes an execution block 115 to execute instructions and a fetch block 113 to interleavingly fetch and issue instructions for execution by the execution block 115. The fetch block 113 is configured to interleavingly fetch and issue instructions from multiple instruction execution threads. Such a configuration may improve the performance (e.g., per area/power) for a system running multiple tasks simultaneously, as compared to a multi-core processor. In one embodiment, the fetch block 113 interleavingly fetches and issues instructions from at least a first instruction execution thread and a second instruction execution thread, for execution by the execution block 115.

In various embodiments, the fetch block 113 provides for thread switch when changing between instruction execution threads. As such, an instruction from a second thread may be executed immediately after an instruction from a first thread, such that the respective instructions are executed on subsequent cycles.

In one embodiment, the fetch block 113 is coupled to the execution block 115 and includes an allocated program counter 182 corresponding to each instruction execution thread so that the processing unit 110 may switch between threads by switching which program counter provides the next instruction. Accordingly, switching may associate each thread with an allocated program counter 182. In one embodiment, the fetch block 113 of the processing unit 110 associates a first program counter with the first instruction execution thread and at least one other program counter with each additional instruction execution thread. In one embodiment, each instruction execution thread has a different program counter 182.

In one embodiment, the fetch block 113 may alternatively provide switching using dedicated registers associated with each thread. The dedicated registers, refereed to herein as thread registers, are configured to load the address into the program counter of the next instruction to be executed based on which thread is selected next. The thread registers may also include the number of cycles a particular thread should be active.

In various embodiments, the memory 120 is a smaller, faster memory than storage 170 and is generally configured to store a subset of instructions for at least one thread. As shown in FIG. 1, the memory 120 may be shared, in various embodiments, between multiple threads in a multi-thread processing system, such that the instructions from each thread may be interleaved due in part to the multiple corresponding program counters 182 in the processing unit 110. In one embodiment, the memory 120 is used in conjunction with an embedded processor. In an alternative embodiment to interleaved embodiments, the memory 120 may be partitioned for each thread.

In various embodiments, the memory 120 may functionally operate as a Level 1 (L1) cache by providing faster response time than the instruction cache 130 or storage 170. Accordingly, when a requested thread address is found in the memory 120, the instruction associated with the address might not need to be retrieved from the instruction cache 130 or storage 170. In one embodiment, a memory 120 is configured to store at least a first and a second corresponding subset of instructions of first and second instruction threads.

An instruction cache 130 may store additional instructions associated with a thread. In a multi-thread environment, one embodiment dynamically allocates a portion of the instruction cache to each thread. Accordingly, in one embodiment the instruction cache 130 is configured to store at least a first and a second corresponding subset of instructions of the first and second instruction threads. In one embodiment, using an embedded processor, the instruction cache 130 is coupled to the memory 120 and may operate as a Level 2 (L2) cache. In an alternative embodiment, the memory 120 is merely a subset of the instruction cache 130 and the data cache 140.

Similarly, the data cache 140 may store data associated with a thread. In various embodiments, the instruction cache 130 and data cache 140 may be dynamically allocated. Moreover, in contrast to the illustrated configuration, one embodiment enables the instruction cache 130 and data cache 140 to be co-located in the same cache.

In one embodiment, upon determining that a cache miss has occurred for either the instruction cache 130 or the data cache 140, the processing unit 110 is configured to allow a second thread to use the processing unit 110 while a first thread waits for data to be retrieved from a remote memory location, such as storage 170.

In one embodiment, a scheduler 150 controls the interleavingly fetching and issuing of instructions by the fetch block 113. In one embodiment, the scheduler 150 outputs an execution thread selection signal to a select block 184 in the fetch block 113 to control interleavingly fetching and issuing of instructions by the fetch block 113. In one embodiment, the scheduler 150 controls interleavingly fetching and issuing of instructions by the fetch block 113, based at least in part on corresponding contiguous execution clock cycle allocations of the instruction execution threads. In one embodiment, the fetch block 113 is adapted to fetch and issue at least one instruction from an instruction cache 130 for a selected one of the first and second instruction execution threads each time the fetch block 113 is signaled by the scheduler 150 to fetch instructions for the selected one of the first and second instruction execution threads.

In one embodiment, the processing unit 100 includes interrupt circuitry for an interrupt handler 160 to interrupt the fetch block 113. These interrupts may be initiated on behalf of an instruction execution thread associated with an application and/or an operating system.

The interrupt handler 160, in one embodiment, delivers interrupts associated with a specific instruction execution thread. Accordingly, in one embodiment, the fetch block 113, while fetching and issuing instructions for an instruction execution thread other than the first instruction execution thread, is adapted to immediately switch to fetch and issue instructions for the first instruction execution thread upon receipt of an interrupt for the first instruction execution thread. In accordance with at least one embodiment, the fetch block 113 is adapted to fetch and issue at least one instruction for a first instruction execution thread to determine at point of execution the thread is before processing a received interrupt for the first instruction execution thread.

In accordance with one embodiment, the fetch block 113 only processes an interrupt for a selected instruction execution thread while fetching and issuing instructions for that selected instruction execution thread. If a received interrupt is for an unselected instruction execution thread, the fetch block 113 may either ignore the received interrupt or queues the received interrupt into a buffer 117 for later processing upon switching to the appropriate thread. In accordance with various embodiments, the fetch block 113 may process an interrupt for a selected instruction execution thread at any time, whether it is selected or unselected.

Storage 170 may include firmware memory, programmable memory, non-volatile memory, read only memory (ROM), electrically programmable memory, random access memory (RAM), flash memory (which may include, for example, NAND or NOR type memory structures), magnetic disk memory, and/or optical disk memory. Either additionally or alternatively, memory 170 may comprise other and/or later-developed types of computer-readable memory including electrical, optical, acoustical or other form of propagated signals (e.g., carrier waves, infrared signals, digital signals). Machine-readable firmware program instructions may be stored in storage 170. In one embodiment, the storage 170 includes any storage medium or machine-accessible medium and/or any storage mechanism that provides (i.e., stores and/or transmits) information in a form readable by a machine (e.g., a computer).

Figure 2:
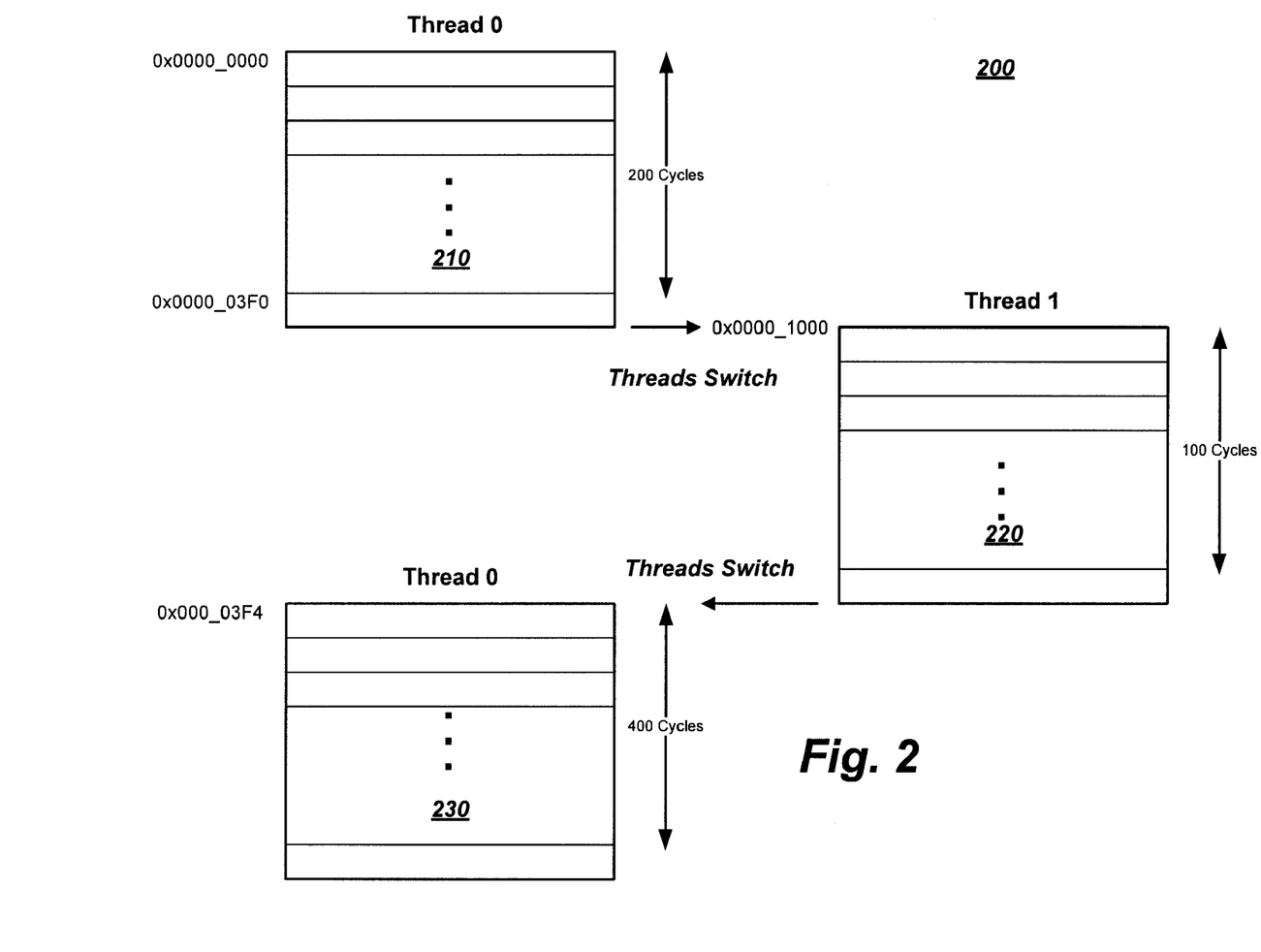
FIG. 2 illustrates threads switching on a multi-thread processor with dynamic bandwidth allocation for each thread, in accordance with various embodiments.

Referring to FIG. 2, a multi-thread processor 200 switching between threads is illustrated. In accordance with various embodiments of the multi-thread processing environment 100 shown in FIG. 1, the multi-thread processor 200 includes dynamic bandwidth allocation for each thread. The multi-thread processor 200 may dynamically change the processing bandwidth and/or number of cycles allocated to a thread. In this manner, the system may adjust access and usage of available processing resources based in part on the priority and/or activity of the various threads requesting execution. In the illustrated example, instructions from two threads (Thread 0 and Thread 1) are separated into multiple execution blocks of variable length for processing by multi-thread processor 200 including a first execution block 210 that is 200 cycles in length, a second execution block 220 that is 100 cycles in length, and a third execution block 230 that is 400 cycles in length. The first execution block 210 draws instructions from Thread 0 beginning with the instructions found at 0x0000_0000 and continues for 200 cycles until 0x0000_03F0. Once the multi-thread processor 200 changes from Thread 0 to Thread 1, the instructions of the second execution block 220 for Thread 1 beginning at 0x0000_1000 are processed for 100 cycles. Upon switching back to Thread 0, the multi-thread processor 200 begins processing the third execution block 230 at the next instruction for Thread 0, shown as 0x0000_03F4, and continues for 400 cycles. In one embodiment, each execution block may customize length and thread according to various factors including the relative priority of the threads.

Figure 3:
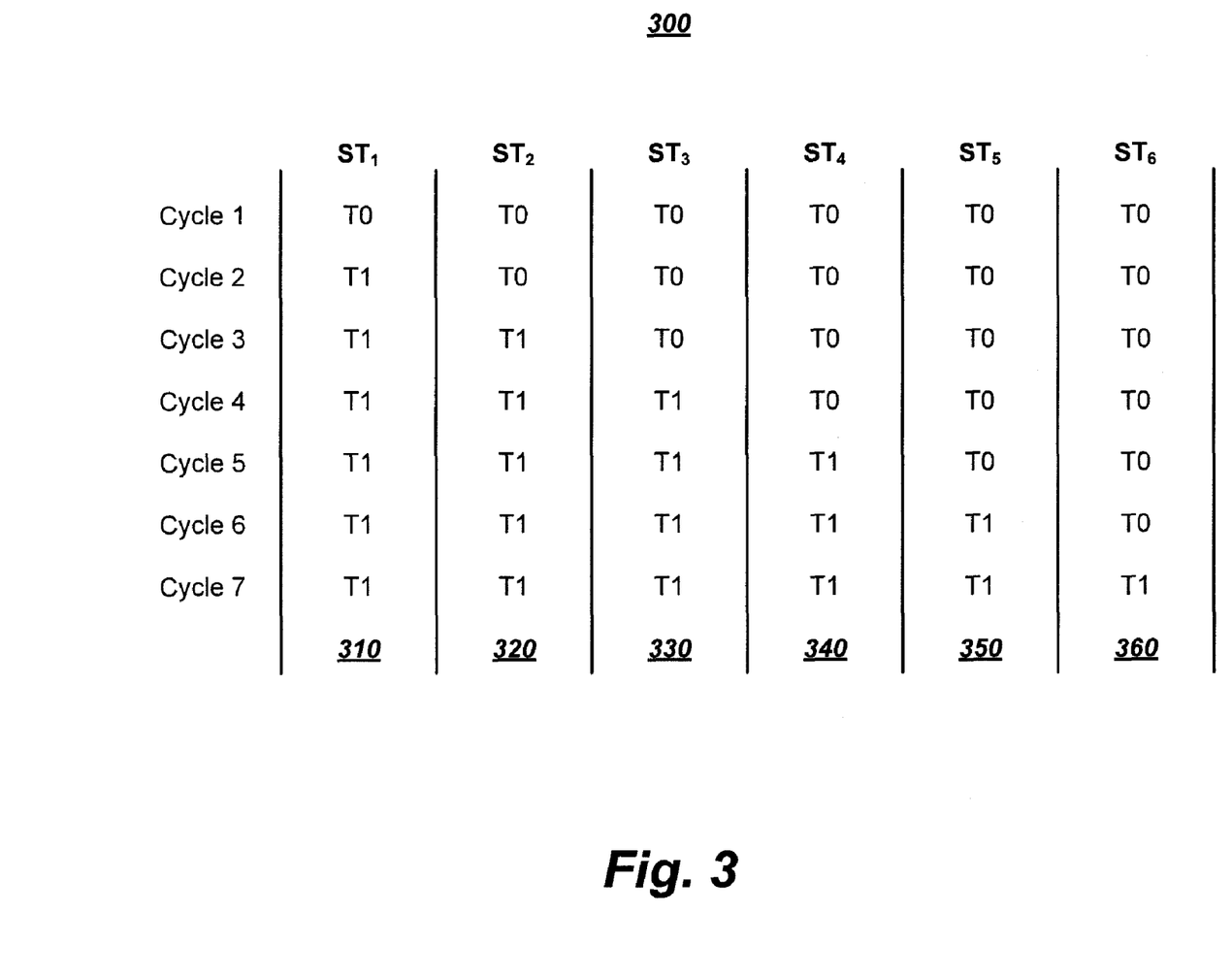
FIG. 3 illustrates a chronological processing stage progression following a thread switch, in accordance with various embodiments.

Referring to FIG. 3, a cyclical instruction processing stage progression 300 following a thread switch in a multi-thread processor is shown. The progression 300 shows an exemplary six stage multi-thread processor, in accordance with various embodiments. The various processing stages shown include $ST_1$ 310, $ST_2$ 320, $ST_3$ 330, $ST_4$ 340, $ST_5$ 350, and $ST_6$ 360. Various embodiments may exhibit alternative configurations that include different stage types and/or a different number of stages based on the design and intended functionality of the multi-thread processor.

In cycle 1, an instruction from a first instruction execution thread T0 is introduced into the first processing stage, $ST_1$ 310. Other instructions from the first instruction execution thread T0 are introduced into the subsequent processor stages.

In cycle 2, an instruction from a second instruction execution thread T1 is provided to the first processing stage, $ST_1$ 310. The remaining instructions from the first instruction execution thread T0 are introduced into the subsequent processor stages.

In cycle 3, the first provided instruction from the second instruction execution thread T1 is introduced into the second processing stage, $ST_2$ 320. A second instruction from the second instruction execution thread T1 is introduced into the first processing stage, $ST_1$ 310. The remaining instructions from the first instruction execution thread T0 are introduced into the subsequent processor stages.

In cycle 4, the first provided instruction from the second instruction execution thread T1 is provided to the third processing stage, $ST_3$ 330. Second and third instructions are provided to the second and first stages, respectively. As previously described the remaining instructions from the first instruction execution thread T0 are provided to the subsequent processor stages.

In cycle 5, the first provided instruction from the second instruction execution thread T1 is introduced into the fourth processing stage, $ST_4$ 340. Subsequent instructions from the second instruction execution thread T1 are provided to respective preceding stages and the remaining instructions from the first instruction execution thread T0 are provided to the subsequent processor stages.

In cycle 6, the first provided instruction from the second instruction execution thread T1 is introduced into the fifth processing stage, $ST_5$ 350. Subsequent instructions from the second instruction execution thread T1 are provided to respective preceding stages and the last remaining instruction from the first instruction execution thread T0 is provided to the last processor stage ($ST_6$ 360).

In cycle 7, the first provided instruction from the second instruction execution thread T1 is introduced into the sixth processing stage, $ST_6$ 360. Subsequent instructions from the second instruction execution thread T1 are provided to respective preceding stages.

Figure 4:
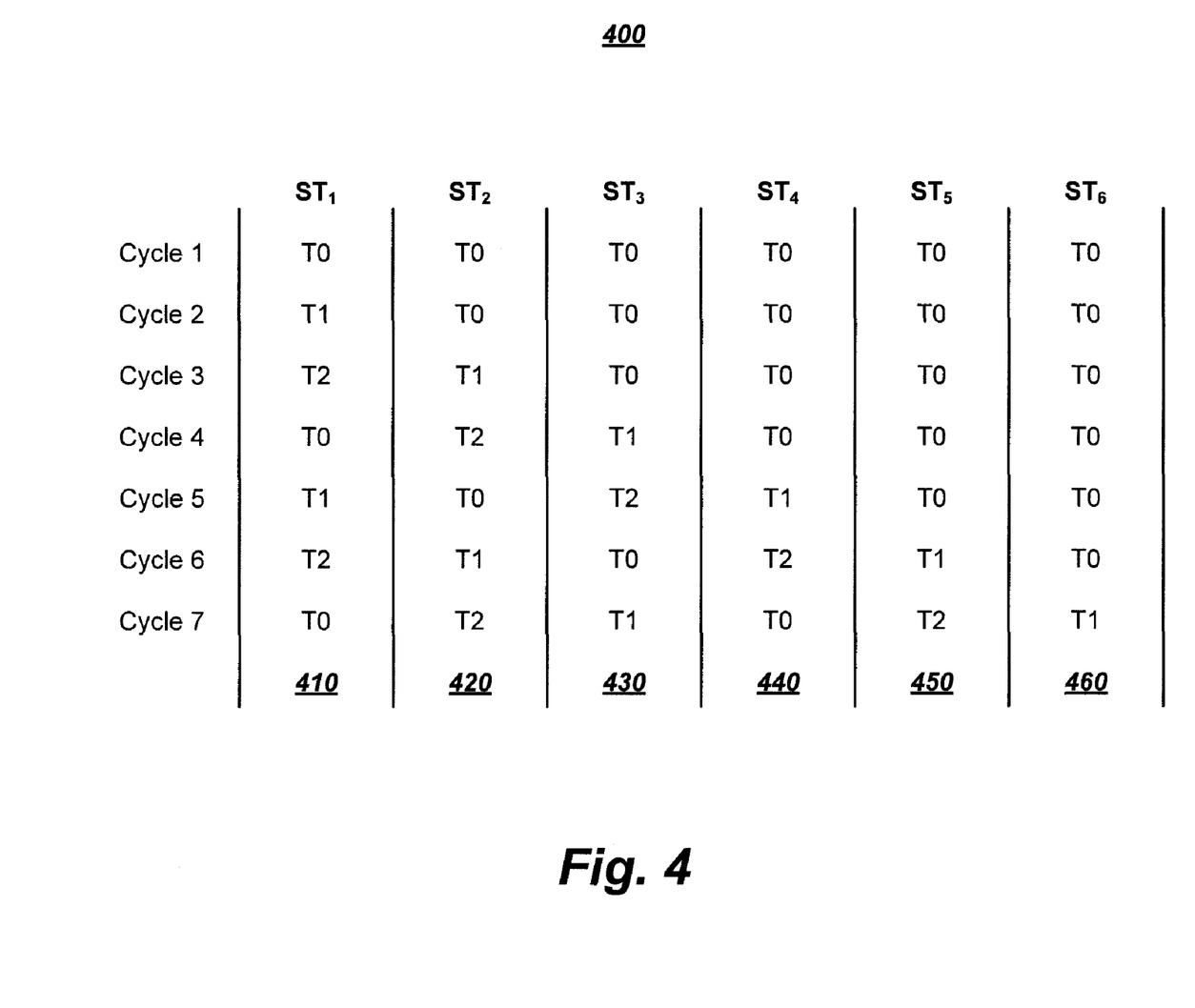
FIG. 4 illustrates a chronological processing stage progression following multiple thread switches, in accordance with various embodiments.

Referring to FIG. 4, a chronological processing stage progression 400 following multiple thread switches is shown in accordance with various embodiments. The progression 400 shows three threads (T0, T1, and T2) of instructions and six stages ($ST_1$ 410, $ST_2$ 420, $ST_3$ 430, $ST_4$ 440, $ST_5$ 450, and $ST_6$ 460) of an exemplary multi-thread processor, in accordance with various embodiments. The progression 400 shows a new instruction from a new thread provided to the first stage each cycle. In this manner, the multi-thread processor is able to provide switching between the various threads. As previously noted, alternative embodiments may exhibit different processor configurations with different stage types and/or different numbers of stages based on the design and intended functionality of the multi-thread processor.

Figure 5:
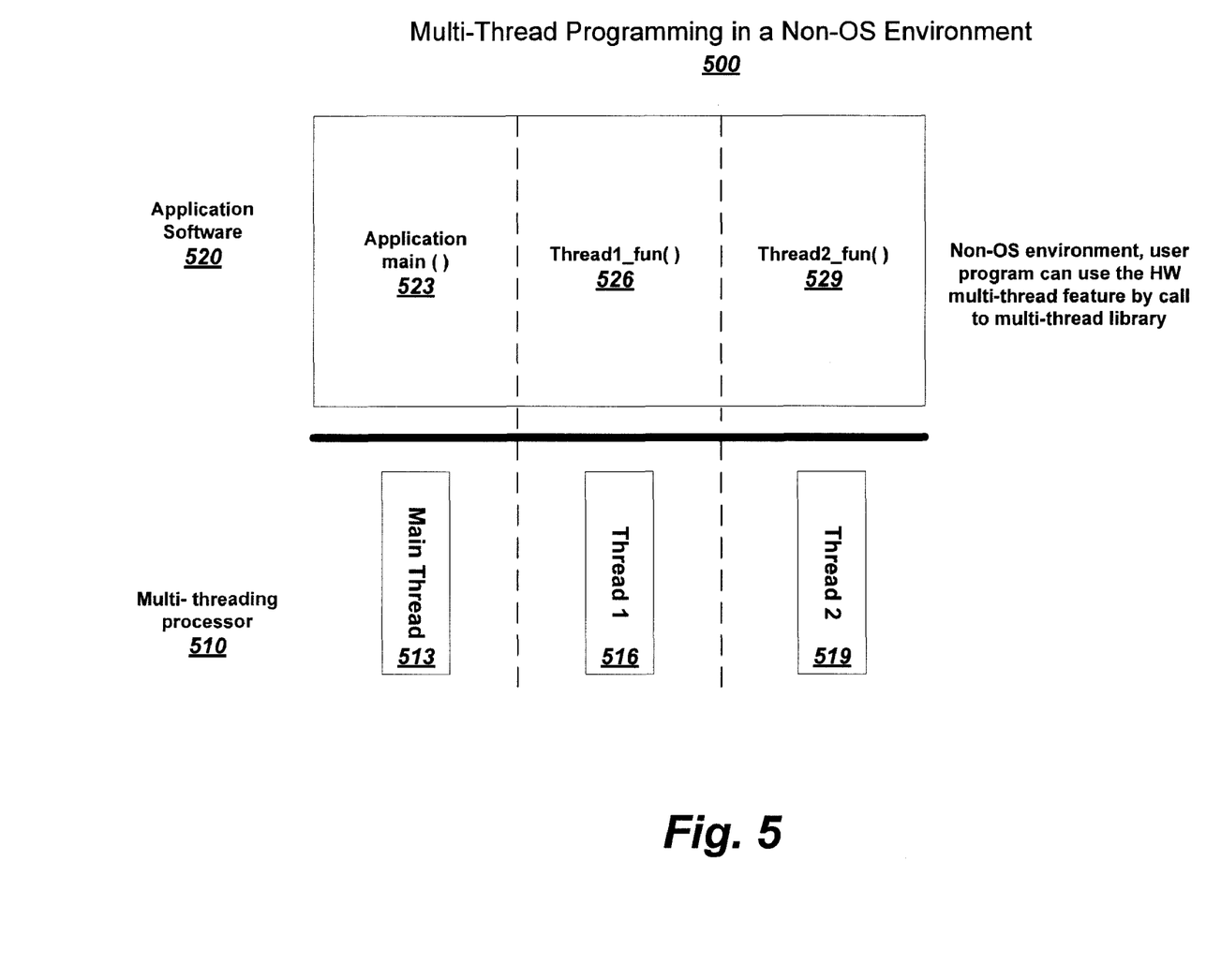
FIG. 5 illustrates a block diagram of interleaving multi-thread processes in a processing environment without an operating system in accordance with at least one embodiment.
Figure 6:
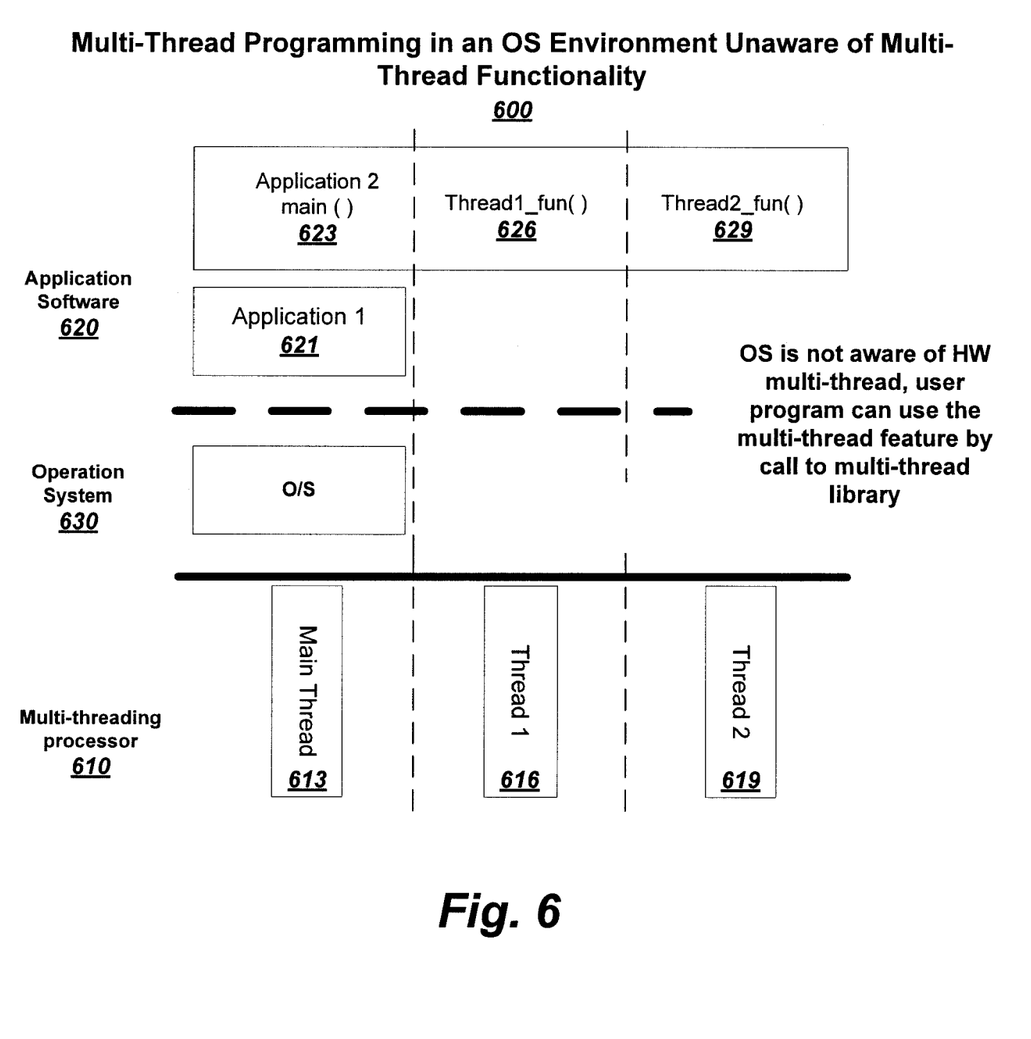
FIG. 6 illustrates a block diagram of interleaving multi-thread processes in a processing environment with an operating system unaware of multi-thread functionality in accordance with at least one embodiment.
Figure 7:
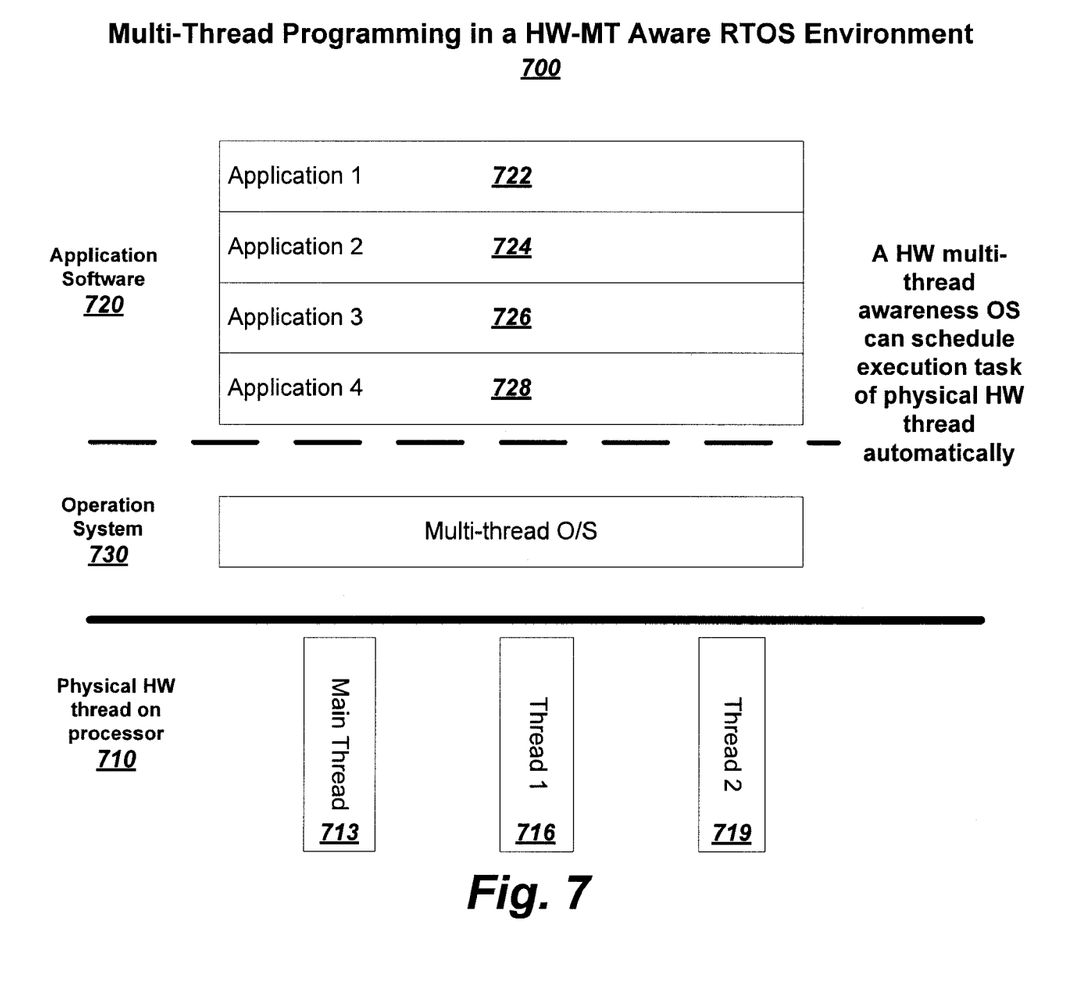
FIG. 7 illustrates a block diagram of interleaving multi-thread processes in a processing environment with an operating system aware of multi-thread functionality in accordance with at least one embodiment.

As previously indicated, a multi-threading system may be configured in a variety of ways. FIGS. 5-7 illustrate three exemplary configurations. Typically the systems will include at least one multi-thread processor, memory, and one or more thread management components. The multi-thread processor is adapted to switch between various execution threads. Each processor has an execution block to execute instructions and a fetch block to at least interleavingly fetch and issue instructions as previously described in FIG. 1. As previously indicated, one embodiment of the fetch block includes a separate program counter correspondingly allocable to each instruction execution thread. The multi-threading system may further include memory configured to store information associated with the various instruction execution threads. The stored information may include, among other things, instruction information associated with when the various instruction execution threads are to be executed by the least one multi-thread processor. The multi-threading system may also include one or more thread management components, which may be in the form of, for example, software and/or firmware, that control switching between the various instruction execution threads in accordance with the stored information associated with the various instruction execution threads and execution of instructions of a selected instruction execution thread by the at least one processor in accordance with the stored instruction information associated with the selected instruction execution thread. The one or more thread management components may be part of an operating system or they may operate independently, and take the form of software, firmware and/or hardware.

Referring to FIG. 5, a block diagram of interleaving multi-thread processes in accordance with at least one embodiment is shown in a processing environment 500 without an operating system (non-O/S). Non-O/S processing environments 500 may include embedded systems, such as automobile control systems where a centralized control system might not be desired and/or be reliable. In the illustrated multi-thread system of FIG. 5, a multi-threading processor 510 includes three threads, a main thread 513, a first thread 516, and a second thread 519. The application software 520 running on the multi-threading processor 510, includes a main application 523 associated with the main thread 513, a first thread function 526 associated with the first thread 516, and a second thread function 529 associated with the second thread 526.

Referring to FIG. 6, a block diagram of interleaving multi-thread processes in accordance with at least one embodiment is shown in a processing environment 600 with an operating system 630 that is unaware of multi-thread functionality, i.e., the operating system does not know that the hardware of the processing environment 600 has multi-thread functionality. The illustrated multi-thread system includes multi-threading processor 610, multi-thread application software 620, and operating system 630. The multi-threading processor 610 including three threads, a main thread 613, a first thread 616, and a second thread 619. The application software 620 including a first unthreaded application 621 and a second threaded application running on the operating system 630 on the multi-threading processor 610. The second threaded application includes a main application 623 associated with the main thread 613, a first thread function 626 associated with the first thread 616, and a second thread function 629 associated with the second thread 626.

Referring to FIG. 7, a block diagram of interleaving multi-thread processes in accordance with at least one embodiment is shown in a processing environment 700 with a multi-thread operating system. The illustrated multi-thread system includes multi-threading processor 710, multi-thread application software 720, and multi-threaded operating system 730. The multi-threading processor 710 including three threads, a main thread 713, a first thread 716, and a second thread 719. The application software 720 includes a first application 722, a second application 724, a third application 726, and a fourth application 728 running on the multi-threaded operating system 730 (i.e., the operating system supports multiple hardware threads) on the multi-threading processor 710. As a result, the multi-threaded operating system 730 can automatically schedule execution of tasks to the various threads of the multi-threading processor 710.

Figure 8:
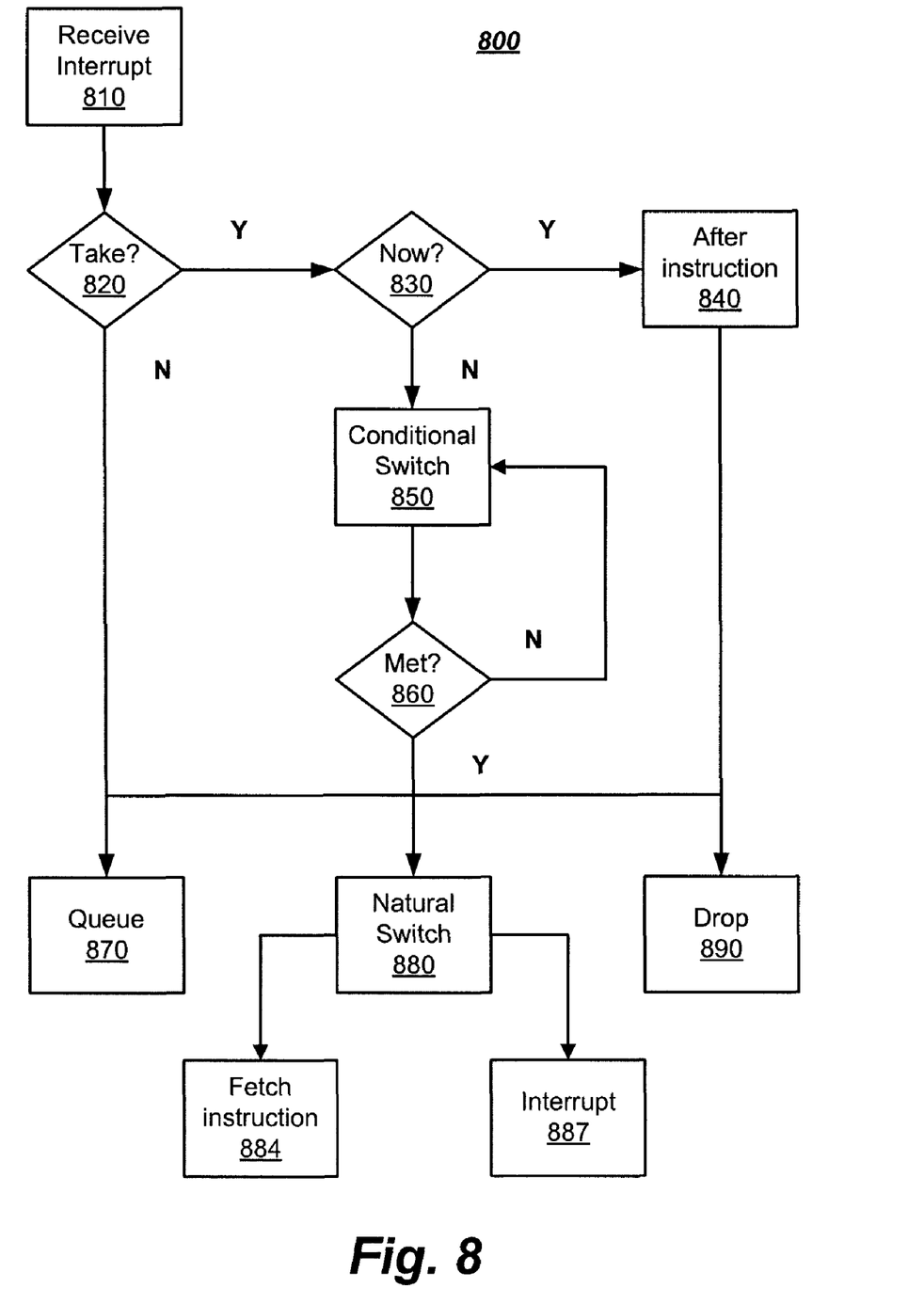
FIG. 8 illustrates, in further detail, a flow diagram view of a portion of the operations associated with interrupts of a multi-thread device as presented in FIG. 1, in accordance with various embodiments.
Figure 9:
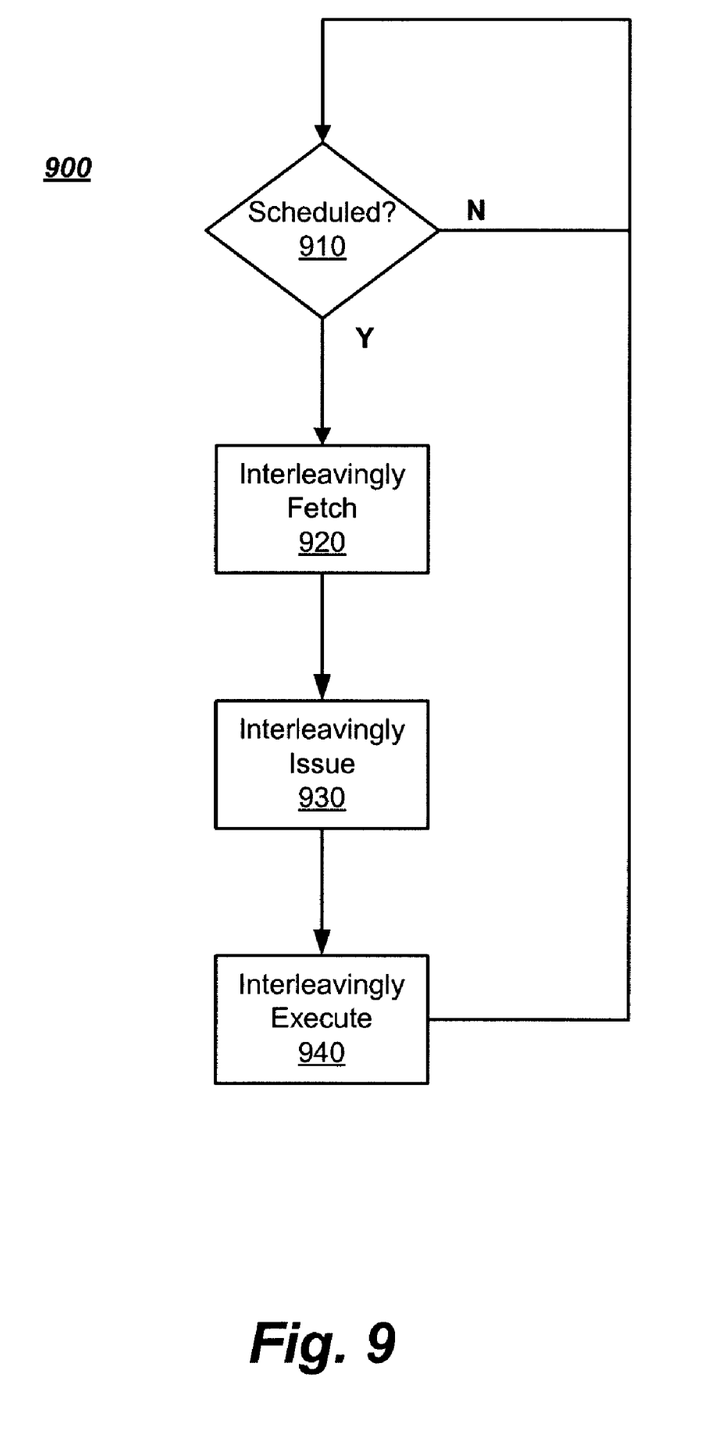
FIG. 9 illustrates, in further, a flow diagram view of a portion of the operations associated with instruction dispatch by a multi-thread device as presented in FIG. 1, in accordance with various embodiments.

Turning now to FIGS. 8-9, methods, in accordance with various embodiments, are described in terms of computer firmware, software, and/or hardware with reference to a series of flow diagrams. In various embodiments, portions of the methods to be performed by a processing device may constitute state machines or computer programs made up of computer-executable instructions. These instructions are typically maintained in a storage medium accessible by the processing device.

Describing the methods by reference to a flow diagram enables one skilled in the art to develop such programs including such instructions to carry out the methods on suitably configured processing devices, such as a multithread processor of a computing device executing the instruction execution threads from machine-accessible media. The computer-executable instructions may be written in a computer programming language or may be embodied in firmware logic. If written in a programming language conforming to a recognized standard, such instructions can be executed on a variety of hardware platforms and for interface to a variety of operating systems, such as multithread aware and non-multithread operating systems.

The various embodiments are not described with reference to any particular programming language. It will be appreciated that a variety of programming languages may be used to implement the teachings of at least one embodiment of the invention as described herein. Furthermore, it is common in the art to speak of software, in one form or another (e.g., program, procedure, process, application . . . ), as taking an action or causing a result. Such expressions are merely a shorthand way of saying that execution of the software by a network device causes the processor of the computer to perform an action or a produce a result.

Referring to FIG. 8, a flow diagram of a portion of the operations of a multi-thread processing unit 800 as presented in FIG. 1 in further detail is shown in accordance with various embodiments. The multi-thread processing unit 800 receives an interrupt in block 810. In query block 820, the multi-thread processing unit 800 determines whether to acknowledge the interrupt. If the received interrupt is not acknowledged, the denied interrupt may be selectively sent to at least one of a queue in block 870 for later action, a natural switch in block 880 (i.e., the next point at which a thread switch is to occur during processing) upon expiration of the current thread in which the interrupt will be evaluated at the next thread switch, and dropped in block 890, i.e., ignored.

If the interrupt is acknowledged, then the multi-thread processing unit 800 determines whether the interrupt should be handled now in block 830. If the interrupt is handled, the multi-thread processing unit 800 executes one instruction in block 840 before transitioning. Upon execution of the interrupt, the multi-thread processing unit 800 may determine that the interrupt request should be selectively sent to at least one of the following: the queue in block 870, the natural switch in block 880, or dropped in block 890.

Otherwise, if the interrupt is not immediately handled, then the multi-thread processing unit 800 may impose a conditional switch in block 850 indicating when the interrupt may be handled. Once the condition is met/satisfied in query block 860, the multi-thread processing unit 800 may determine how the interrupt request should be selectively handled. More specifically, whether the interrupt request should be sent to the queue in block 870, the natural switch in block 880, or dropped in block 890.

If the interrupt is sent to the queue in block 870 by the multi-thread processing unit 800, the interrupt may be later resent by an interrupt handler. In one embodiment, a separate queue may exist for each thread, thus if the interrupt is intended for another thread, it will be sent to the queue associated with that thread.

If the interrupt is sent to the natural switch in block 880 by the multi-thread processing unit 800, the interrupt will be evaluated at the next thread switch. Upon preparing to switch threads, the interrupt handler may either interrupt the multi-thread processing unit 800 in block 887. Alternatively, the multi-thread processing unit 800 may fetch the next instruction from the next thread in block 884 if the interrupt is no longer relevant or does not have sufficient priority to interrupt the next thread.

Otherwise, the multi-thread processing unit 800 will drop the interrupt request in block 890. In many configurations, interrupts will be resent if they continue to be considered significant by the interrupt handler or device generating the interrupt. As such dropping an interrupt may not impede the effectiveness of the multi-thread processing unit 800.

Referring to FIG. 9, a flow diagram of a portion of the operations associated with instruction dispatch by a multi-thread processor 900, as presented in FIG. 1 in further detail is shown in accordance with various embodiments. In accordance with a mode of at least one embodiment of the invention, the multi-thread processor 900 includes a scheduler to determine scheduling in query block 910. The scheduler determines to interleavingly fetch and to interleavingly issue instructions of instruction execution threads using an execution thread selection signal. In accordance with an added mode of at least one embodiment of the invention, the scheduling is based at least in part on corresponding contiguous execution clock cycle allocations of the instruction execution threads.

Upon determining that instruction dispatch is scheduled in block 910, the multi-thread processor 900 interleavingly fetches in block 920 first instruction execution information from a first program counter for a first instruction execution thread and second instruction execution information from a second program counter for a second instruction execution thread. In various embodiments, the multi-thread processor 900 may interleavingly fetch instructions in dynamically allocated clusters. The multi-thread processor 900 may interleavingly fetch instructions in block 920 by allowing a single thread to access neighboring thread fetch clusters, by using idle fetch clusters to provide multiple-path execution, or use available fetch clusters to widen the effective single-thread fetch block.

The multi-thread processor 900 also includes interleavingly issuing, in block 930, at least one instruction for the first instruction execution thread based on the fetched first instruction execution information and at least one instruction for the second instruction execution thread based on the fetched second instruction execution information. Additionally, the multi-thread processor 900 interleavingly executes in block 940 the at least one issued instruction for one of the first instruction execution thread and at least one instruction for the second instruction execution thread by a processor.

In accordance with an additional mode of at least one embodiment of the invention, the fetching in block 920 of the first and second instruction execution information includes receiving start address information to initiate an instruction task. The receiving start address information may include reading the first program counter for the first instruction execution thread, and the second program counter for the second instruction execution thread with a new start address. In accordance with one mode of at least one embodiment of the invention, the receiving instruction information also includes receiving scheduled instruction information from a storage location. In this manner, the multi-thread processor 900 may operate on other threads until instructions are retrieved from a remote location for a thread awaiting the instructions.

While various figures illustrate an in-order CPU pipeline, those skilled in the art will understand that the present invention may be extended to an out-of-order CPU pipeline. Additionally, while portions of the description and figures describe two or three instruction threads, those skilled in the art will understand that the present invention may be extended to systems for executing more than two or three instruction threads.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that various embodiments of the invention be limited only by the claims and the equivalents thereof.

What is claimed is:

1. An apparatus comprising:
    an execution block to execute instructions;
    a fetch block coupled to the execution block, the fetch block including at least a first program counter and a second program counter correspondingly allocatable to a first instruction execution thread and a second instruction execution thread, the fetch block to at least interleavingly fetch and issue instructions of the first instruction execution thread and the second instruction execution thread for execution by the execution block; and
    interrupt circuitry coupled to the fetch block, the interrupt circuitry to initiate an interrupt of behalf of the first instruction execution thread,
    wherein the fetch block is further configured to
        receive the interrupt for the first instruction execution thread while fetching and issuing instructions of the second instruction execution thread,
        fetch and issue, (i) in response to receiving the interrupt for the first instruction execution thread and (ii) prior to processing the received interrupt for the first instruction execution thread, at least one instruction of the first instruction execution thread to determine a point of execution of the first instruction execution thread,
        process the received interrupt for the first instruction execution thread subsequent to fetching and issuing the at least one instruction of the first instruction execution thread, and
        switch to fetch and issue instructions of the first instruction execution thread in response to processing the received interrupt.

2. The apparatus of claim 1, further comprising a scheduler coupled to the fetch block, the scheduler to control interleavingly fetching and issuing of instructions by said fetch block.

3. The apparatus of claim 2, wherein the scheduler outputs an execution thread selection signal to the fetch block to control interleavingly fetching and issuing of instructions by the fetch block.

4. The apparatus of claim 2, wherein the scheduler controls interleavingly fetching and issuing of instructions by the fetch block, based at least in part on corresponding contiguous execution clock cycle allocations of the first and second instruction execution threads.

5. The apparatus of claim 2, wherein the fetch block fetches and issues at least one instruction for a selected one of the first and second instruction execution threads each time the fetch block is signaled by the scheduler to fetch instructions for the selected one of the first and second instruction execution threads.

6. The apparatus of claim 1, wherein the interrupt circuitry comprises a first interrupt circuitry block and a second interrupt circuitry block, the first interrupt circuitry block and the second interrupt circuitry block to respectively initiate interrupts for the first instruction execution thread and the second instruction execution thread.

7. The apparatus of claim 1, wherein the fetch block is configured to process an interrupt for a selected one of the first instruction execution thread and the second instruction execution thread only while fetching and issuing instructions for the selected one of the first instruction execution thread and the second instruction execution thread.

8. The apparatus of claim 1, further comprising memory to store at least a first subset of instructions and a second subset of instructions corresponding to the first instruction thread and the second instruction thread.

9. The apparatus of claim 8, wherein the memory is cache memory.

10. The apparatus of claim 1 further comprising an instruction cache to store at least a first subset of instructions and a second subset of instructions corresponding to the first instruction thread and the second instruction thread.

11. The apparatus of claim 1, wherein the apparatus is an embedded processor.

12. The apparatus of claim 1, wherein the apparatus is a processor.

13. The apparatus of claim 1, wherein the apparatus is an integrated circuit.

14. A method comprising:
    fetching and issuing one or more instructions of a first instruction execution thread to an execution unit for execution during a first time period, in accordance with a first program counter of a processor allocated to the first instruction execution thread;
    receiving an interrupt for a second instruction execution thread while fetching and issuing instructions of the first instruction execution thread;

stopping said fetching and issuing of instructions of the first instruction execution thread in response to receiving the interrupt for the second instruction execution thread;

in response to stopping said fetching and issuing of instructions of the first instruction execution thread and prior to processing the received interrupt for the second instruction execution thread, fetching and issuing at least one instruction of the second instruction execution thread to determine a point of execution of the first instruction execution thread, processing the received interrupt for the second instruction execution thread subsequent to fetching and issuing the at least one instruction of the second instruction execution thread; and in response to processing the received interrupt for the second instruction execution thread, switching to fetching and issuing one or more instructions of the second instruction execution thread to the execution unit for execution during a second time period following the first time period, in accordance with a second program counter of the processor.

15. The method as recited in claim 14, further comprises generating a switching signal to cause said stopping, and start of said fetching and issuing of the one or more instructions of the second instruction execution thread.

16. The method as recited in claim 15, said generating of the switching signal is in response to an expiration of the first time period.

17. The method as recited in claim 15, wherein said generating of the switching signal is in response to an interrupt.

18. The method as recited in 14, further comprising:

stopping said fetching and issuing of instructions of the second instruction execution thread; and fetching and issuing third one or more instructions of the first instruction execution thread to the execution unit for execution during a third time period following the second time period, in accordance with the first program counter.

19. The method as recited in claim 14, further comprising:

stopping said fetching and issuing of instructions of the second instruction execution thread; and fetching and issuing third one or more instructions of a third instruction execution thread to the execution unit for execution during a third time period following the second time period, in accordance with a third program counter of the processor allocated to the third instruction execution thread.

20. An apparatus comprising:

execution means for executing instructions;

an instruction dispatch means coupled to the execution means, the instruction dispatch means including multiple program counter means for interleavingly fetching and issuing instructions of different execution threads for execution; and an interruption means coupled to the execution means, the interruption means for initiating an interrupt on behalf of a first instruction execution thread;

wherein the multiple program counter means is configured to receive an interrupt for the first instruction execution thread while fetching and issuing instructions of a second instruction execution thread, fetch and issue, (i) in response to receiving the interrupt for the first instruction execution thread and (ii) prior to processing the received interrupt for the first instruction execution thread, at least one instruction of the first instruction execution thread to determine a point of execution of the first instruction execution thread, process the received interrupt for the first instruction execution thread subsequent to fetching and issuing the at least one instruction of the first instruction execution thread, and switch to fetch and issue instructions of the first instruction execution thread in response to processing the received interrupt.

21. The apparatus as recited in claim 20, further comprising scheduling means coupled to the instruction dispatch means, the scheduling means for controlling the instruction dispatch means.

22. The apparatus as recited in claim 20, further comprising interrupt means coupled to the instruction dispatch means, the interrupt means for interrupting the instruction dispatch means.

23. The apparatus as recited in claim 20, further comprising storage means for storing the instructions of the first instruction execution thread and the second instruction execution thread.

24. A system comprising:

at least one multi-thread processor adapted to switch between a first execution thread and a second execution thread, the at least one multi-thread processor having an execution block to execute instructions, and a fetch block coupled to the execution block, the fetch block to at least interleavingly fetch and issue instructions of the first and second instruction execution threads for execution by the execution block, the fetch block including at least a first program counter and a second program counter correspondingly allocatable to the first and the second instruction execution threads;

memory configured to store information associated with the first and the second instruction execution threads, the information including instruction information associated with when the first and the second instruction execution threads are to be performed by the at least one multi-thread processor; and one or more thread management components configured to (i) switch without penalty between the first and the second instruction execution threads in accordance with the stored information associated with the first and the second instruction execution threads and (ii) execute instructions of an instruction execution thread selected by the at least one multi-thread processor in accordance with the stored instruction information associated with the selected instruction execution thread;

wherein the fetch block is further configured to receive an interrupt for the first instruction execution thread while fetching and issuing instructions of the second instruction execution thread, fetch and issue, (i) in response to receiving the interrupt for the first instruction execution thread and (ii) prior to processing the received interrupt for the first instruction execution thread, at least one instruction of the first instruction execution thread to determine a point of execution of the first instruction execution thread, process the received interrupt for the first instruction execution thread subsequent to fetching and issuing the at least one instruction of the first instruction execution thread, and switch to fetch and issue instructions of the first instruction execution thread in response to processing the received interrupt.

25. The system as recited in claim 24, wherein the one or more thread management components activate a program counter with the start address of the second instruction execution thread when switching from the first instruction execution thread.

26. The system as recited in claim 24, wherein the one or more thread management components are part of an operating system.

27. The system as recited in claim 24, further comprises an operating system unaware of the at least one multi-thread processor but configurable to use the one or more thread management components.

* * * * *